United States Patent
Pelella et al.

(10) Patent No.: US 12,025,975 B2
(45) Date of Patent: Jul. 2, 2024

(54) METHOD AND SYSTEM FOR MODELING OPERATIONS OF A PHYSICAL PLANT

(71) Applicant: General Electric Company, Schenectady, NY (US)

(72) Inventors: Marco Pelella, Florence (IT); Mirco Calosi, Florence (IT)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 569 days.

(21) Appl. No.: 16/608,906

(22) PCT Filed: Apr. 18, 2018

(86) PCT No.: PCT/EP2018/059950
§ 371 (c)(1),
(2) Date: Oct. 28, 2019

(87) PCT Pub. No.: WO2018/197308
PCT Pub. Date: Nov. 1, 2018

(65) Prior Publication Data
US 2020/0183370 A1    Jun. 11, 2020

(30) Foreign Application Priority Data
Apr. 26, 2017    (IT) .................. 102017000045152

(51) Int. Cl.
*G06Q 10/06* (2023.01)
*G05B 17/02* (2006.01)
(Continued)

(52) U.S. Cl.
CPC ....... *G05B 19/41885* (2013.01); *G05B 17/02* (2013.01); *G06Q 10/0639* (2013.01);
(Continued)

(58) Field of Classification Search
USPC ...................................................... 705/7.38
See application file for complete search history.

(56) References Cited

U.S. PATENT DOCUMENTS 7,271,728 B2    9/2007    Taylor et al.
7,444,193 B2    10/2008   Cutler
(Continued)

FOREIGN PATENT DOCUMENTS

CN    1582432 A    2/2005
CN    102077437 A    5/2011
(Continued)

OTHER PUBLICATIONS

Massoud Amin (S. Massoud Amin, Smart Grid: Overview, Issues and Opportunities. Advances and Challenges in Sensing, Modeling, Simulation, Optimization and Control, European Journal of Control, vol. 17, Issues 5-6, 2011, pp. 547-567, ISSN 0947-3580).*
(Continued)

*Primary Examiner* — Matthew D Henry
(74) *Attorney, Agent, or Firm* — Fletcher Yoder, P.C.

(57) ABSTRACT

Methods and systems (100) for modeling operations of a physical plant (110) are presented. For instance, a system (100) includes at least a first component (111) and a second component (112). The first and second components (111), (112) have at least one physical connection (130*a*). First and second model operational parameters of the physical connection are received from first and second models 121, 122, respectively. The first and second models (121), (122) are updated with the second and first model operational parameters, respectively. In one example, the first and second models (121), (122) run on different computer systems. In another example, real-time operational data is received from the first and second components (111), (112), and the first and second models (121), (122) are updated with the real-time operational data received from the second and first
(Continued)

components, respectively. In a further example, the system (100) may receive and process simulation input. In various examples, the physical connections (130*a*) may include a material stream, a rotating shaft or a control signal.

20 Claims, 5 Drawing Sheets

(51) Int. Cl.

| | | |
|---|---|---|
| *G05B 19/418* | (2006.01) | |
| *G06Q 10/0639* | (2023.01) | |
| *G06Q 50/00* | (2012.01) | |
| *G09B 25/02* | (2006.01) | |

(52) U.S. Cl.
CPC ............. *G06Q 50/00* (2013.01); *G09B 25/02* (2013.01); *G05B 2219/32342* (2013.01)

(56) References Cited

U.S. PATENT DOCUMENTS

| | | | |
|---|---|---|---|
| 7,490,029 | B2 | 2/2009 | Wasynczuk et al. |
| 8,977,402 | B2 | 3/2015 | Garcia |
| 9,606,531 | B2 | 3/2017 | Cheng et al. |
| 10,331,813 | B2 | 6/2019 | Goulkhah et al. |
| 10,496,061 | B2 | 12/2019 | Strohmenger et al. |
| 2007/0129917 | A1* | 6/2007 | Blevins .................. G06F 30/20 703/6 |
| 2011/0131017 | A1* | 6/2011 | Cheng ............. G05B 19/41885 703/2 |
| 2012/0010758 | A1* | 1/2012 | Francino ................ G05B 17/02 700/291 |
| 2013/0204587 | A1* | 8/2013 | Cheng .................... G05B 17/02 703/2 |
| 2014/0128996 | A1* | 5/2014 | Sayyarrodsari .. G05B 19/41885 700/29 |
| 2015/0134313 | A1 | 5/2015 | Maturana et al. |
| 2015/0134314 | A1 | 5/2015 | Maturana et al. |
| 2015/0134317 | A1* | 5/2015 | Maturana ............... G05B 17/02 703/13 |
| 2015/0253768 | A1 | 9/2015 | Meng et al. |
| 2016/0281607 | A1* | 9/2016 | Asati ........................ F02C 7/26 |
| 2017/0300933 | A1* | 10/2017 | Mascaro .................. G06N 7/01 |

FOREIGN PATENT DOCUMENTS

| | | |
|---|---|---|
| CN | 102081358 A | 6/2011 |
| CN | 104635508 A | 5/2015 |
| CN | 104737084 A | 6/2015 |
| CN | 105849570 A | 8/2016 |
| CN | 105988367 A | 4/2017 |
| EP | 2871540 A2 | 5/2015 |
| JP | 2004510219 A | 4/2004 |
| JP | 2008544373 A | 12/2008 |
| JP | 2008544374 A | 12/2008 |
| WO | WO01098871 A2 | 12/2001 |

OTHER PUBLICATIONS

International Search Report of the International Searching Authority for PCT/EP2018/059950 with mailing date of Jul. 6, 2018.
Japanese Office Action (Notice of Allowance) for JP Application No. 2019-558392 dated Aug. 3, 2021; 5 pgs.
Chinese Office Action for CN Application No. 201880027516.1 dated Feb. 8, 2022; 17 pgs.
European Office Action for EP Application No. 18 717 937.9 dated Nov. 4, 2021; 10 pgs.
Korean Notice of Allowance for KR Application No. 10-2019-7033669 dated Aug. 31, 2021; 6 pgs.
Korean Written Opinion for KR Application No. 10-2019-7033669 dated May 28, 2021; 13 pgs.

\* cited by examiner

METHOD AND SYSTEM FOR MODELING OPERATIONS OF A PHYSICAL PLANT

BACKGROUND

The subject matter disclosed herein relates to operations and modeling techniques, and more particularly to methods and systems for modeling the operations of a physical plant. For instance, in the oil and gas industry, a physical plant may provide functionality for gas liquefaction, refining, etc. The physical plant may include compressors, heat exchangers, turbines, pumps, valves, actuators, regulators, blowers, control systems, and other physical components. In the design of a physical plant, the physical components are connected in a specific manner to achieve specific engineering design goals. The components are connected to enable the flow of materials like organic and inorganic fluids (in both gas and liquid phases), allow mechanical connectivity of rotating equipment like gas turbines, steam turbines, gas engines or electric motors, drive operating machines such as compressors (such as axial, centrifugal and reciprocating) and pumps (such as axial, centrifugal and reciprocating), and enable relevant control systems of both static and rotating equipment.

In one example, a physical plant may include numerous physical components supplied by different vendors. In order to enable modeling and simulation of the behavior of the physical plant, the different vendors may design and implement proprietary modeling software that models the behavior of the specific physical component based on operating models of the physical component as well as the inputs and outputs to the component, also known as boundary conditions or boundary limits. Because of the proprietary nature of the modeling software for each component, conventional system modeling techniques typically require discrete stages of simulation in which a first component is simulated by the first model assuming certain boundary limits, the outputs of which are then input into a second model for simulating a second component using, as boundary limits, also the outputs of the first model, and so forth. The process is manually iterated several times until the different models are converging on the same boundary limits and a validated solution by the several parties involved in the simulation scenario. Such a manual iterative processes can take weeks to achieve, increasing the time and cost requirements when modeling and/or simulating physical plant operations. The scenario becomes even more complicated when an external control systems is linked to one or more different dynamic models and several iterations of calculation are needed to converge on the same solution valid for all the subsystems, i.e. boundary limits convergence. The alternative to that is that a single party create a unique model using simplified models for the equipment that are out of its own expertise and direct supply. In that scenario it is lost the possibility to use high fidelity models of all the components of the plant.

SUMMARY

Methods and systems for modeling operations of a physical plant are presented. For instance, a system includes at least a first component and a second component. The first and second components have at least one physical connection. First and second model operational parameters of the physical connection are received from first and second models, respectively. The first and second models are updated with the second and first model operational parameters, respectively. An advantage that may be realized in the practice of some disclosed embodiments of the method or system is the ability to improve the quality and reduce the cycle time of simulating or modeling operations of an entire physical plant. Another advantage is that only operational parameters corresponding to the physical connection between the components modeled are exchanged between the models, so proprietary details on the models and on how the operational parameters exchanged are generated need not be shared.

In one example, the first and second models run on computer systems located in different geographical locations, which are not connected through a common local area network. In another example, real-time operational data is received from the first and second components, and the first and second models are updated with the real-time operational data received from the second and first components, respectively. In a further example, the system may receive and process simulation input. In various examples, the physical connections may include a material stream, a rotating shaft or a control signal.

The above embodiments are exemplary only. Other embodiments are within the scope of the disclosed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the disclosed subject matter encompasses other embodiments as well. The drawings are not necessarily to scale, emphasis generally being placed upon illustrating the features of certain embodiments of the invention. In the drawings, like numerals are used to indicate like parts throughout the various views.

DETAILED DESCRIPTION

Embodiments of the disclosed subject matter provide techniques for modeling operations of physical plants. Other embodiments are within the scope of the disclosed subject matter. For instance, the methods and systems disclosed herein may be used for modeling the operations of a physical plant, such as oil and gas industry physical plants, factories, semiconductor or other fabrication facilities, or any other system in which numerous components are connected to one another by defined physical and/or logical interfaces. Advantageously, the techniques allow for multi-vendor systems in which certain proprietary details of components and simulation and modeling logic may be kept secure, allowing the design of a system that combines best of breed components to achieve design goals, and concurrently supporting advanced and enhanced simulation and modeling logic. As another advantage, the simulation and modeling logic can be used to support numerous different tasks, including system design, system modeling (e.g., "what-if" scenario modeling), automated training, failure mode analysis, etc.

By way of explanation, modern infrastructures such as oil and gas physical plants or complex factories or fabrication facilities can include a variety of interconnected equipment or components. The components may be interconnected together through physical or logical interfaces. For example, in a liquefaction plant, a material stream may flow through connections between various components such as compressors or heat exchangers. Each of the components may have numerous subcomponents and a complex operation environment. These components may be sourced from different vendors, with each vendor specializing in different aspects of the overall infrastructure. Because each vendor may desire to keep proprietary details of a component secret, modeling or simulation software may be deployed that only models or simulates one component at a time, and vendors may not divulge the details of their modeling software. Under such circumstances, a need exists for a multi-vendor, interoperable system that allows for modeling and simulation, in a synchronized manner, including exchanging boundary conditions in real time, of a macro system that includes numerous components.

Figure 1:
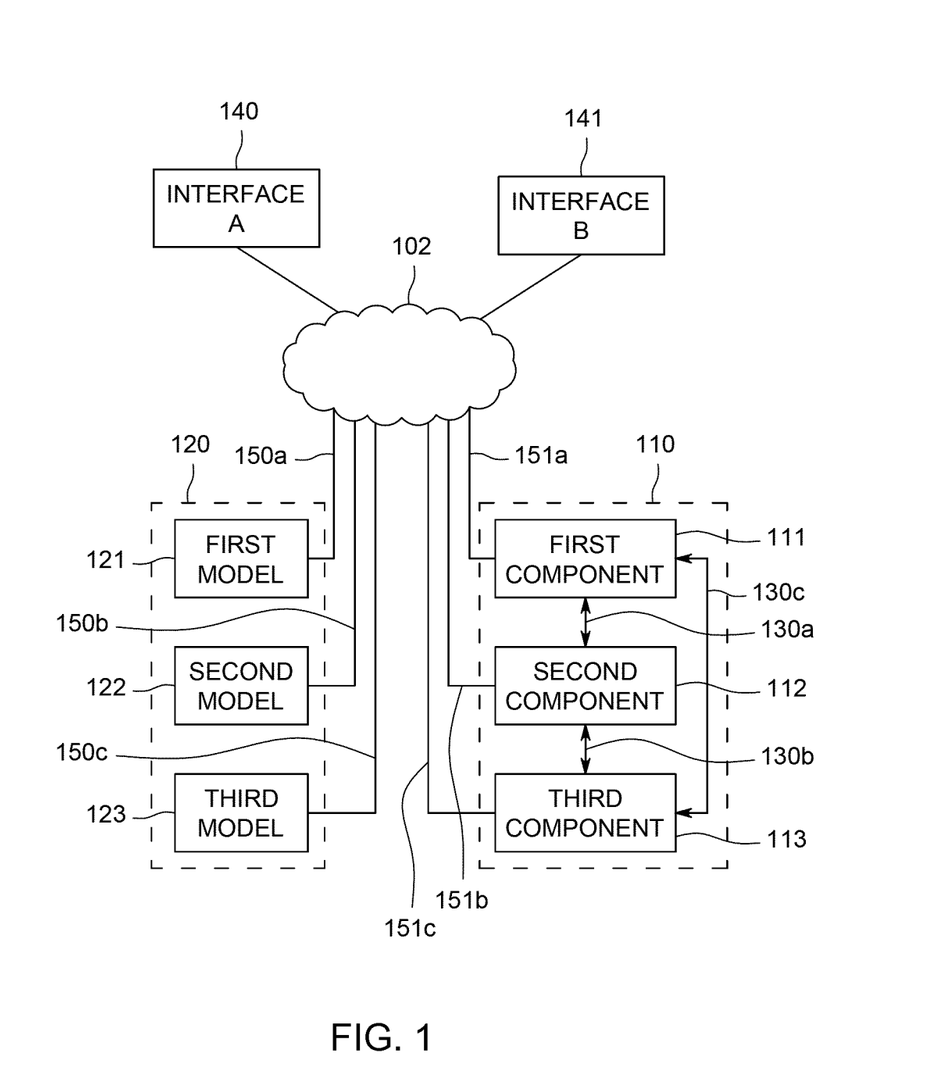
FIG. 1 is a diagram of an example physical plant and an example system for modeling operations of a physical plant.
Figure 2:
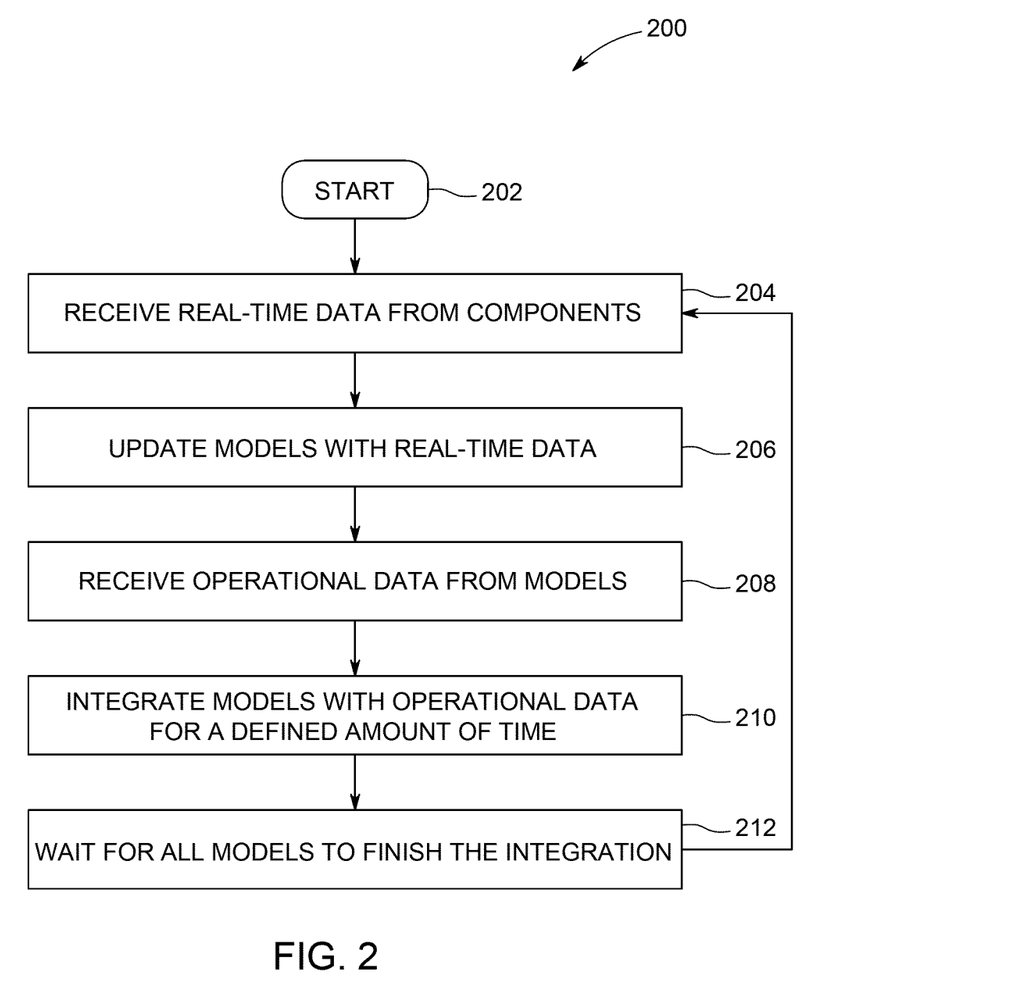
FIG. 2 is a flow diagram of an example method of modeling operations of a physical plant.
Figure 3A:
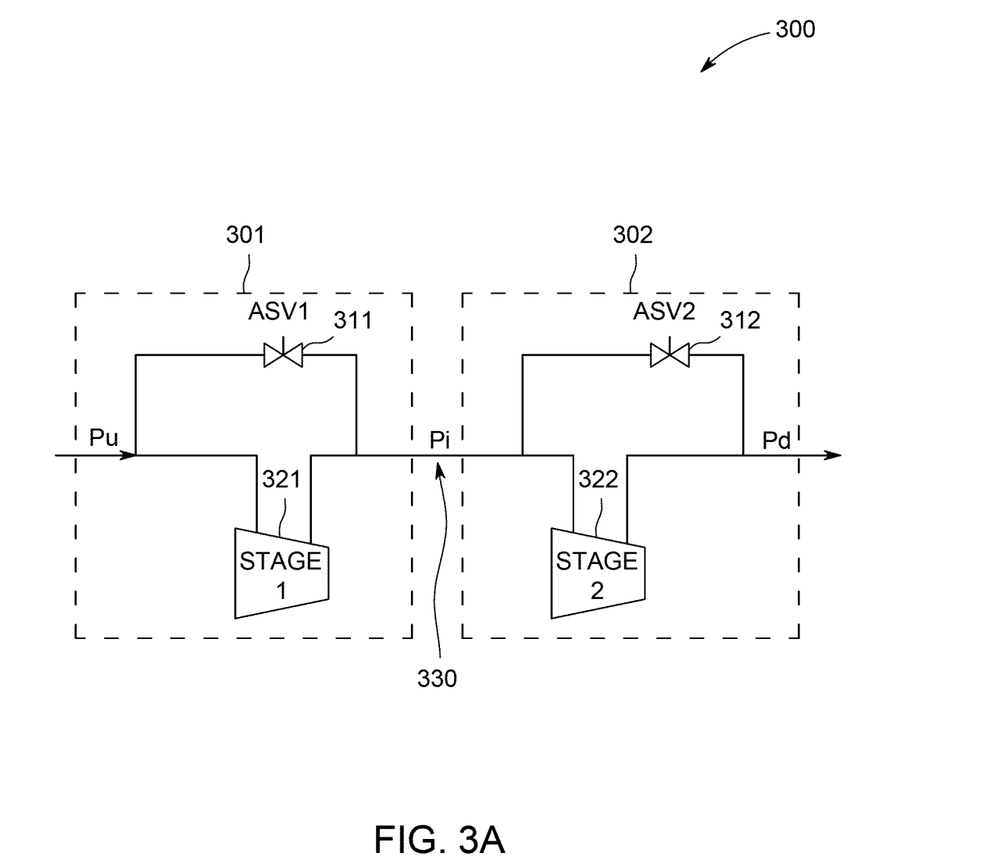
FIGS. 3A and 3B depicts an example two-stage compressor physical plant.
Figure 3B:
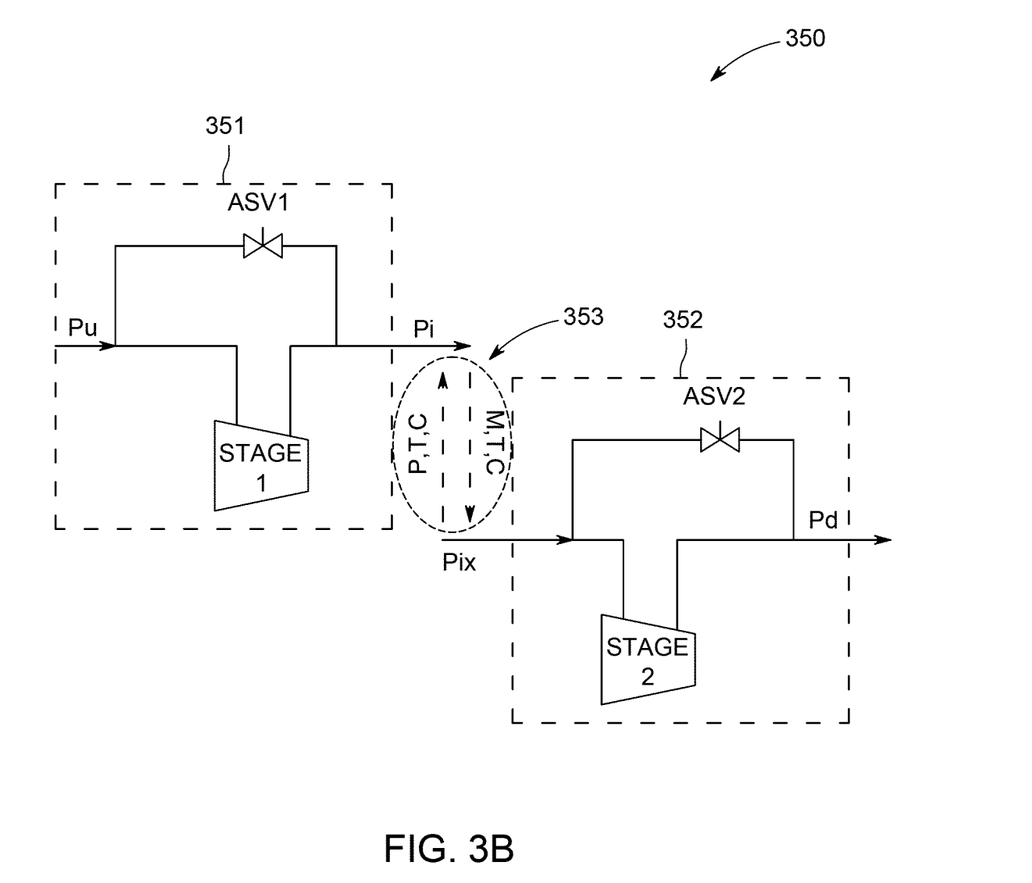
Figure 4:
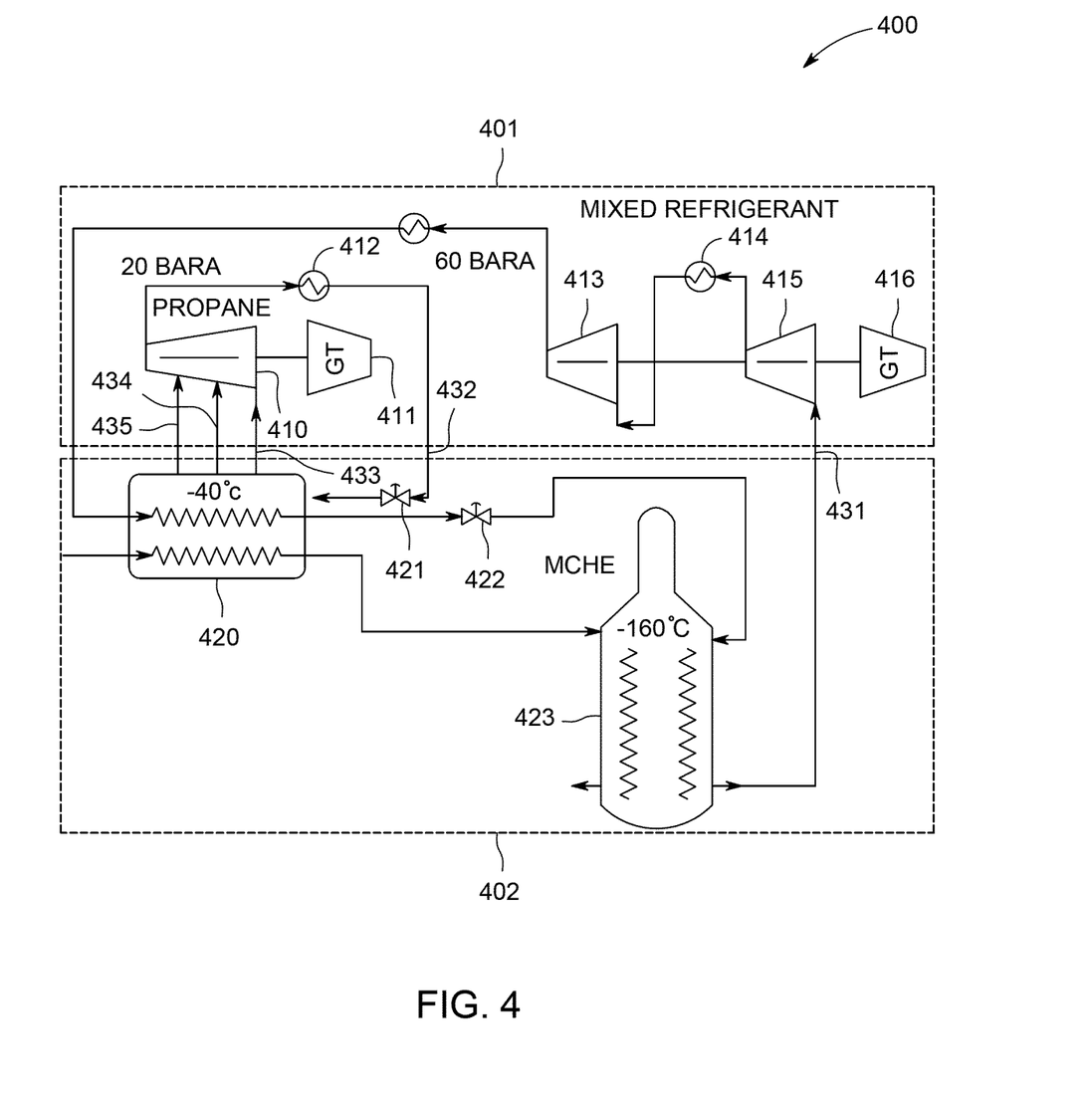
FIG. 4 depicts an example liquefaction physical plant.

By way of explanation, first FIGS. 1 and 2 depict an example physical plant 110, single models used to simulate single components of the physical plant 120 and an example operations modeling method 200, respectively. FIGS. 3A-4 depict further details with respect to example physical plants encountered in the oil and gas industry. FIG. 1 is a diagram of an infrastructure 100 which includes an example physical plant 110, single models used to simulate single components of the physical plant 120 and an example system 102 for modeling operations of the physical plant 110. The physical plant 110 includes numerous components, including a first component 111, a second component 112, and a third component 113. Example components include compressors, heat exchangers, turbines, pumps, valves, actuators, regulators, blowers, control systems, etc.

In one example, the system 102 may be a computer system having one or more processors, a memory, and computer-readable medium for storing various program files. For example, the system 102 may include a database and server software for carrying out the method steps described below, and may have a web based user interface for allowing access. The system 102 may operate on a multi-processor system or on a virtualized server farm, depending on the amount of components controlled and network traffic due to the system. In other examples, the system 102 may be an embedded controller for compact operation, and may be co-located with other components, or the system 102 may be located in a computer blade of a server farm. The system 102 includes software components for sending and receiving network traffic, and may include one or more wireless or wireline network interfaces. In another example, the system 102 may operate across multiple, geographically disparate computer systems in order to provide redundancy. Further implementation details of the system 102 and the other computer-based components described herein, including storage and programming methodologies, are set forth below.

In one embodiment, the system 102 can run in a cloud environment or in a local computer system. The system 102 may coordinate the single simulation models of the components guaranteeing synchronization among them and exchanging between them in real time the required boundary conditions, i.e. the operational parameters relevant to the physical connection between the components The components 111-113 may be connected through numerous physical connections. For example, a physical connection 130a connects the first component 111 and the second component 112. In addition, a physical connection 130b connects the first component 111 and the third component 113. Further, a physical connection 130c connections the second component 112 and the third component 113. The physical connections may be connected via piping, electrical infrastructure, control signals, mechanical linkages (e.g., rotating shafts), etc. These connections may be characterized in terms of one or more of a mass flow, a material composition, a material stream, a pressure, a temperature, a control protocol, a shaft speed, torque, etc.

Each of the components 111-113 has an affiliated model. Specifically, the first component 111 is affiliated with a first model 121, the second component 112 is affiliated with a second model 122, and the third component 113 is affiliated with a third model 123. As may be readily understood, each of the models 121-123 may be embodied in one or more computer programs running on one or more separate computer systems. In other examples, a more compact environment may allow multiple models to run on a single computer system.

By way of example, a model may include a software simulation program that includes equations describing the physical behavior of the components 111-113 in response to changes in operational parameters and boundary conditions seen by the components 111-113. For example, the software simulation programs may simulate the behavior of the physical components 111-113 by any suitable means, such as a discrete integration method that proceeds using time steps of a defined step size. The software simulation programs for each of the models may operate on separate computer systems, or may be co-located on a single computer system, depending on the size and complexity of the overall deployment.

In one embodiment, first model operational parameters of the physical connection 130a may be received from a first model 121 of the first component 111. Second model operational parameters of the physical connection 130a may be received from a second model 122 of the second component 112, and so forth. The system 102 may update the first model 121 with the second model operational parameters and the second model 122 with the first model operational parameters. For example, the first model 121 may run on a first computer system and the second model 122 may run on a second computer system. In another example, the system 102 may updated each of the models 121-123 with operational parameters from the other two models. The system 102 may include search engine logic that is capable of receiving parameters from numerous models, storing the parameters, and distributing the parameters to the other models, based on internal logic that is aware of the overall topology of the physical plant 110 and the configuration of the physical connections 130a-c. For example, in order to protect the proprietary internal information of the individual models, the owner of each single model may and decide which operational parameters of the model are shared with the other models, and configure the models appropriately.

In one example, the connections 150a-c between the single models 121-123 and the system 102 and the connections 151a-c between the single components 111-113 and the system 102 may be established, for example, through an Internet connection if the system 102 is cloud based. In another example, the same connections may be established through a local area network (LAN) connection if the system 102 is running in a local computer system. In a further example, the connections 150a-c and 151a-c may be encrypted to enhance the cyber security of the system.

For example, real-time operational data may be received from the components 111-113, and each the models 121-123 may be updated with the received data, e.g., the data received from components affiliated with the other models. In such a case, the components are advantageously updated with new data and operational parameters of the other models in real-time, but without having the models confined to operating on a single computer, thus allowing each model to retain security of its internal details.

Various human machine interfaces, which may be graphical user interfaces, may connect to the system 102. For example, a training interface A 140 may be provided for training and an engineering interface B 141 may be provided for engineering/design purposes.

One example usage of the infrastructure 100 is as a training system, e.g., for operators of a physical plant. In such a case, the system 102 can receive simulation input from a training interface A 140. The simulation input can include various input parameters relating to the components 111-113, such as operational parameters related to the physical connections 130a-130c. After receiving the input, the models 121-123 may be updated. In one example, the training system allows operators to be trained on the dynamics of a live system in terms of physical plant management, allowing for an understanding of how various changes in one component impact the other components and the overall functioning of the system.

In another example, the system 102, connections 150a-c and 151a-c and interfaces 140-141, may be employed an engineering design system, e.g., for use by engineers designing the physical plant 110. In such a case, the system 102 can receive design input from an engineering interface B 141. Results of the simulation of the infrastructure 100 may be used by design engineers to improve performance and efficiency of the design of each component 111-113.

In another example, the infrastructure 100 is used to predict the behavior of the physical plant in various scenarios that are different from the actual operation of the physical plant. In such a manner, new and more efficient scenarios of operation of the physical plant may be determined. These new scenarios may optimize the operation of the physical plant, for example, for maximum production rate, minimum energy consumption, etc. Such "what-if" analysis may be used for engineering design purposes, or for training purposes.

In another example, the infrastructure 100 is used to compare the results of the simulation with the real-time data of the physical plant (i.e. GAP analysis). This allow the engineers to understand is some components of the physical plants are not performing as expected and a maintenance or other intervention on the component is required.

FIG. 2 is a flow diagram of an example method 200 of modeling operations of a physical plant, or a portion thereof. As described in FIG. 1, the physical plant includes at least a first component and a second component which have at least one physical connection. In the embodiment of FIG. 2, the method 200 at block 202 starts when simulation of a physical plant is desired, e.g., for operations, design, or training purposes. In such a case, each of the physical components can have a corresponding model which runs on an associated computer system. The corresponding model is designed to simulate and model the operations of the physical component. Method 200 is initiated at block 202 from the system 102 when the corresponding command is received from the human user from Interface A 140 or interface B 141 of FIG. 1.

Next, the method 200 at block 204 receives real-time data from the components 111-113. The real-time data can include real-time operational data of the physical connection between the components. For example, the data may include a mass flow rate, a material composition description, a material stream characterization, a pressure value, a temperature reading, a control protocol message, a shaft speed, or a shaft torque. By way of example, the real-time data may be updated every second, and may be sent over an encrypted link. Sensors within the components may trigger sending of updates, to reflect changes in the parameters being monitored.

By way of illustration, an example of material flow, one component may be connected to another component through physical piping through which material flows between the components. In such a case, each of the components may measure various parameters relative to the flow of material from its own side. These parameters may be viewed as boundary conditions between the components. When different models are operating independently, the different models may predict differing values of pressure, temperature, material composition, and the like, at the shared boundaries.

For example, each model may include calculations of specific differential equations, integral equations, heuristic approximations, look-up tables, and other methodologies for simulating the behavior the component being modeled, e.g., through the use of simulation software. These equations may require inputs and outputs, known as boundary conditions or limits, which may be received from the other models. When each model independently operates without frequent updating of boundary conditions, the accuracy of the overall system may not be ideal. Advantageously, and as described below, the present technique allows one model to receive input from other models as to these shared boundary condition parameters. Examples of simulation software include MATLAB, available from MathWorks, Inc., of Natick Mass., USA. Other suitable simulation software includes software that can simulate the behavior of physical equipment by providing as output the values of a set of parameters that describe the status of the equipment as a function of time. In one example, the software receives inputs and calculates outputs on a discrete time basis, such that input and outputs are received/provided at every time step of the simulation. The time step of the simulation can be fixed or variable. Between each time step, the simulation software may resolve a set of equations that describe the equipment (where the equations form a model of the equipment). Example equations include time differential equation (e.g., a differential equation where the derivative of a function is given as an explicit function of the independent variable generally assumed to be time), neural network equations, finite impulse response (FIR) models, state-space models, etc. The models may be time-variant or time-invariant. In one specific example, discrete type equations may be employed, in which the time variable as well as all the other variable (input/output) are treated as a series of values relevant to consecutive time steps (e.g., $t_0, t_1, t_2, \ldots, t_k, t_{k+1}, \ldots$). Once the inputs of the model/equations are provided at the time $t_k$, the simulation provides the outputs relevant to the time $t_{k+1}$. Those outputs may be also input for the next time step calculation, and so on. The difference between $t_{k+1}$ and $t_k$ is the step size, which can be fixed or variable during the simulation.

In one example, after receiving the real-time data from the components, e.g., through connections 151a-c, the method 200 at block 206 updates the models 121-123 with the real-time data from the components 111-113. In one example, the method 200 at block 206 updates the models by sending data messages through connections 150a-c to each of the models to trade the data received either directly from the components, from the other models, or both. Models can be updated with real-time data at each simulation cycle (e.g., a cycle such as block 204→block 206→block 208→block 210→block 212→block 204), once every certain number of simulation cycles, when requested by the user from the interfaces 140-141, or when a significant discrepancy between simulation results and real-time data is detected, necessitating a refresh.

Continuing with the material flow example described above, each of the models can receive the pressure, temperature, material composition, and other parameters measured by the other components at the beginning of each simulation cycle. Then, each model can be iterated, such as through recalculation of equations, etc., to take into account the newly updated parameters.

Next, the method 200 at block 208 receives operational parameter data from each model through the connections 150a-c, stores the parameters, and distributes the parameters to the other models, based on internal logic that is aware of the overall topology of the physical plant 110 and the configuration of the physical connections 130a-c. For example, a topological map of the overall system, including the location of each connection, may be determined. From the determined topological map, a logical relationship between each component, each connection, and each model can list which components have inputs and output in common with other components. Based on this logical mapping, the method 200 may provide the parameters of interest (e.g., parameters from components sharing connections) to the various models affiliated with the various components. Again, the models can be iterated by running the simulation software to take into account the newly updated parameters.

By way of example, the topology of the physical plant and the connections of between the models, as well as the updating of the models may be provided by the user of the application, rather than being pre-defined. For example, the user, when configuring the application, may define each connection between the models through the boundary conditions, such as defining which output variable of one model is an input variable for another model.

In one embodiment, at block 210 of method 200, system 102 sends a command via connections 150a-c to each single model 121-123 to start the simulation and simulate a defined amount of time with the received operational parameters. Each software simulation program simulates the defined amount of time requested by the system 102 integrating the equations describing the physical behavior of the components 111-113 a number of times defined by the amount of time to be simulated and the time step size of the software simulation program. Advantageously, the exchange of operational parameters of the physical connection 130a-c between and among the models facilitates immediate synchronization of the models so that simulation can be run on an ongoing basis instead of through a manual, off-line process.

Next, the method 200 at block 212 waits for all the models to finish the integration of the requested amount of time before cycling back to block 204. For example, in an operator training system, after each operator initiated change, the method 200 may cycle back to block 204 so that the impact of the operator initiated change may be processed by all the models in order to provide the results to the operator. In another example, the method 200 may be configured to continually cycle back to block 204 in order to model the time-dependent evolution of the physical plant. In a further example, in an engineering design situation, the method 200 may be configured to cycle back to block 204 in order to test the changes made by an operator to various parameters during the engineering design process.

Next, specific working examples of the techniques described herein will be set forth with respect to specific example of physical plants and relevant single models connected through infrastructure 100. The description of these example is only by way of example, and not intended to limit the scope of the disclosed techniques, which may be applied to any industrial process in which multiple independent components are deployed and managed.

FIG. 3A depicts an example two compressors single section physical plant 300 that normally can be used in a process plant provided by two different manufacturers. The physical plant 300 includes two compressors, a first compressor 301 and a second compressor 302. The first compressor 301 and the second compressor 302 are physically connected through a physical connection 330 represented by piping, valves and flanges that connect the fluid stream exiting from the first compressor and entering in the second compressor, as a process connection. The first compressor 301 includes a stage-1 compressor 321 and a first recycle valve 311 (e.g., an anti-surge valve), and the second compressor 302 includes a stage-2 compressor 322 and a second recycle valve 302. The physical process connection 330 is characterized by a material stream having a specific gas composition, temperature, pressure, etc. Typically, this can be a scheme applicable to a reinjection plant, where the gas lift compressor s (lower pressure) are provided by one manufacturer and the reinjection compressor (higher pressure injecting into the wells) are provided by a second manufacturer.

In one embodiment illustrating how the compressor physical plant 300 may be simulated using the techniques described above, a system (e.g., the system 102 of FIG. 1) for modeling the operations of the physical plant 300 may include a first model for modeling the first compressor 301 and a second model for modeling the second compressor 302. The first model and the second model may be operating on an embedded controller co-located with the respective compressor 301, 302. In such a case, the physical plant 300 may be modeled with the system 102 in terms of parameters including gas composition, temperature, and pressure readings. The method 200 at block 204 (FIG. 1) may receive the gas composition, temperature, and pressure readings from each of the compressors 301, 302. The method 200 at block 206 (FIG. 2) may then provide compressor 301 with the gas composition, temperature, and pressure readings from compressor 302, and provide compressor 302 with the gas composition, temperature, and pressure readings from compressor 301. In addition, the method 200 at block 208 (FIG. 2) may also receive information from the models that are affiliated with each of compressor 301, 302. Next, the method 200 at blocks 210, 212 (FIG. 2) can allow each of the models (i.e., the models affiliated with compressor 301 and compressor 302) to perform the simulation through integrated operational data, etc., for a pre-defined step time (as appropriate for the specific modeling technique being used; see above). In such a manner, the models affiliated with each compressor 301, 302 will receive and take into account the real-time compressor data (e.g., gas composition, temperature, and pressure readings) from the other compressor, and perform an overall simulation/modeling of the physical plant 300.

FIG. 3B depicts an example on how the physical plant depicted in FIG. 3A is modeled and models are connected using the infrastructure 100. First model 351 covers and simulates the first compressor 301. Second model 352 covers and simulates the second compressor 302. The boundary conditions, i.e. the operational parameters 353 relevant to the physical connection 330 between the two compressors are the gas composition, temperature, pressure, etc. of the material stream between the two compressors. The operational parameters 353 of interest may be different in each direction, and the first compressor model 351 may send material, temperature, and composition information to the second compressor model 352. And, the second compressor model 352 may send pressure, temperature, and composition information to the first compressor model 351. In simulation scenarios like start up or trip or upset of process valves, the parameters and process condition at the intersection between the two compressors are not known and are the consequence of a dynamic interaction among the two compressors, the process valves and their control system.

FIG. 4 depicts an example of simplified methane liquefaction physical plant 400 (e.g., called LNG in industrial applications). The physical plant 400 includes two compressor trains in component 401 with propane and mixed refrigerant compressor (the two trains are depicted on the left hand side and right hand side of the component 401), and a liquefaction component 402. The left hand side compressor train in component 401 includes a propane compressor 410, a gas turbine driver 411, a cooler 412, and the right hand side compressor train in component 401 includes a compressor 413, a cooler 414, a compressor 415, constituting the mixed refrigerant compressors and compressor gas turbine driver 416. The liquefaction component includes a propane pre-cooling heat exchange 420 and a recycle valves 421 connected to the propane compressors 410 and a main cryogenic heat exchanger 423 connected to the mixed refrigerant compressor 413 and 415 with a recycle valve 422. The propane compressor 410 is connected to the pre-cooling component 420 through three connections 433-435, through which vapor phase flows characterized by material composition, temperature, and pressure. The connections 431 is connecting the mixed refrigerant compressor to the main cryogenic heat exchanger characterized by material composition, temperature, and pressure exchange of vapor phase. In the main cryogenic heat exchanger happen the liquefaction of the methane feed gas that passes first in the pre-cooling section 420 and finally in the liquefaction section 423 characterized by the stream passing from gas phase to liquid phase (e.g., through pre-cooling component 420 into the heat exchanger 423) for the storage and transportation through LNG ships.

In one embodiment illustrating how the liquefaction physical plant 400 may be simulated using the techniques described above, a system (e.g., the system 102 of FIG. 1) for modeling the operations of the physical plant 400 may include a first model for modeling, in part, the component 401, which includes the propane compressor 410 and a second model for modeling the component 402, which includes, in part, the pre-cooling heat exchange 420. The first model and the second model may be operating on an embedded controllers co-located with the propane compressor 410 and the pre-cooling heat exchange 420. In such a case, the physical plant 400 may be modeled with the system 102 in terms of parameters including fluid phase, temperature, and pressure readings. The method 200 at block 204 (FIG. 1) may receive the fluid phase, temperature, and pressure readings from each of the propane compressor 410 and the pre-cooling heat exchange 420. The method 200 at block 206 (FIG. 2) may then provide the propane compressor 410 with the gas composition, temperature, and pressure readings from the pre-cooling heat exchange 420, and provide the pre-cooling heat exchange 420 with the gas composition, temperature, and pressure readings from the propane compressor 410. In addition, the method 200 at block 208 (FIG. 2) may also receive information from the models that are affiliated with the propane compressor 410 and the pre-cooling heat exchange 420. Next, the method 200 at blocks 210, 212 (FIG. 2) can allow each of the models (i.e., the models affiliated with the propane compressor 410 and the pre-cooling heat exchange 420) to perform the simulation through integrated operational data, etc., for a pre-defined step time (as appropriate for the specific modeling technique being used; see above). In such a manner, the models affiliated with the propane compressor 410 and the pre-cooling heat exchange 420 will receive and take into account the real-time compressor data (e.g., gas composition, temperature, and pressure readings) from the other compressor, and perform an overall simulation/modeling of the physical plant 400.

The depiction of the specific oil and gas industry physical plant examples herein is meant to be for example purposes only, and not meant to be limiting. Indeed, as may be readily understood by one having familiarity with physical plant modeling, numerous industries make use of complex physical plants, factories, control systems, etc., having multiple, complex, and expensive components. In such cases, the systems and techniques described herein may be used to model the operations of such physical plants or factories.

In view of the foregoing, embodiments of the physical plant modeling system may allow for multi-component industrial physical plants to be simulated and/or modeled. A technical effect is a decrease in cycle time in the design or testing of physical plant infrastructures, such as oil and gas infrastructures, through the use of more accurate models that are more frequently synchronized. This allows for operational parameters of a physical plant to be readily optimized so that the infrastructure operates at a higher level of efficiency. By allowing for frequent synchronization of operational parameters with a set of interacting models, the different models can quickly be updated to more accurately represent real-time operations of the physical plant. In addition, such physical plant modeling can allow engineering teams to use learnings from existing infrastructures to inform the design and implementation of new infrastructures. Further, the training of operators of a complex physical plant can be conducted using the system so that various scenarios, such as plant startup, shutdown, and reaction to critical conditions, can be simulated for training purposes.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As will be appreciated by one skilled in the art, aspects of the present invention may be embodied as the system 102, connections 150*a*-*c* and 151*a*-*c* and interfaces 140-141, of FIG. 1, the method 200 of FIG. 2, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A system for modeling operations of a physical plant, the physical plant comprising at least a first machine component and a second machine component of an industrial machine, at least one physical connection between the at least first and second machine components, and the system comprising a control system having one or more controllers each having a processor, a memory, and instructions stored on the memory and executable by the processor, wherein the control system is configured to:

perform a plurality of simulation cycles with a first model of the first machine component and a second model of the second machine component, wherein the first model runs on a first embedded controller on the first machine component and the second model runs on a second embedded controller on the second machine component, wherein the first model comprises first proprietary data of a first vendor that is kept secure and not shared with the second model, wherein the second model comprises second proprietary data of a second vendor that is kept secure and not shared with the first model, wherein the one or more controllers of the control system comprise the first and second embedded controllers, wherein the first and second vendors are different from one another, wherein each of the first and second machine components comprises at least one rotating equipment, a compressor, a pump, a turbine, an engine, an electric motor, or a heat exchanger, wherein the first and second models comprise a neural network, wherein, for each of the plurality of simulation cycles, the control system is configured to:

receive as input into the second model, first model values for operational parameters of the physical connection generated from the first model of the first machine component;

receive as input into the first model, second model values for operational parameters of the physical connection generated from the second model of the second machine component, wherein the first and second model values are different for the same operational parameters at a common location of the same physical connection;

update the first model with the second model values for the operational parameters and update the second model with the first model values for the operational parameters;

receive real-time operational sensor data from sensors coupled to the first machine component and the second machine component; and update the first model with the real-time operational sensor data received from the second machine component and update the second model with the real-time operational sensor data received from the first machine component;

synchronize the first and second models, including converging the first and second model values to a common modelled solution value for the same operational parameters at the common location of the same physical connection, via iteration through the plurality of simulation cycles, wherein the synchronization improves an accuracy of the modeling of the operations of the physical plant in real-time via the control system;

provide as output a simulation of behavior of the first and/or second machine components using the first and/or second models based on the plurality of simulation cycles; and change one or more operational parameters of the physical plant based on the simulation using the first embedded controller, the second embedded controller, or a combination thereof.

2. The system of claim 1, further comprising:

the first machine component having the first embedded controller configured to run the first model, wherein the first proprietary data of the first vendor is kept secure via encryption; and the second machine component having the second embedded controller configured to run the second model, wherein the second proprietary data of the second vendor is kept secure via encryption.

3. The system of claim 1, wherein the first and second machine components comprise respective first and second compressors, or respective first and second turbines, or respective first and second pumps, or respective first and second heat exchangers, or respective first and second rotating equipment.

4. The system of claim 1, wherein the control system is configured to optimize the one or more operational parameters of the physical plant based on the simulation to improve performance and/or efficiency of the physical plant.

5. The system of claim 1, wherein the at least one physical connection comprises a material stream flowing between the first and second machine components, and the first and second model values for the operational parameters each comprise one or more of a mass flow, a material composition, a pressure or a temperature.

6. The system of claim 1, wherein the at least one physical connection comprises a rotating shaft connecting the first and second machine components, and the first and second model values for the operational parameters comprise one or more of a shaft speed or a shaft torque.

7. The system of claim 1, wherein the control system is configured to perform the plurality of simulation cycles in response to an operator initiated change to enable an evaluation of the operator initiated change.

8. The system of claim 1, comprising the physical plant having the first and second machine components with improvements based on the simulation.

9. A method of modeling operations of a physical plant, the physical plant comprising at least a first machine component and a second machine component of an industrial machine, and at least one physical connection between the first and second machine components, and the method comprising:

performing, via a processor-based system, a plurality of simulation cycles with a first model of the first machine component and a second model of the second machine component, wherein the first model runs on a first embedded controller on the first machine component and the second model runs on a second embedded controller on the second machine component, wherein the first model comprises first proprietary data of a first vendor that is kept secure and not shared with the second model, wherein the second model comprises second proprietary data of a second vendor that is kept secure and not shared with the first model, wherein the processor- based system comprises a control system having the first and second embedded controllers, wherein the first and second vendors are different from one another, wherein each of the first and second machine components comprises at least one of rotating equipment, a compressor, a pump, a turbine, an engine, an electric motor, or a heat exchanger, wherein the first and second models comprise a neural network, wherein, for each of the plurality of simulation cycles, the method comprises:

receiving as input into the second model, first model values for operational parameters of the physical connection generated from the first model of the first machine component;

receiving as input into the first model, second model values for operational parameters of the physical connection generated from the second model of the second machine component, wherein the first and second model values are different for the same operational parameters of the same physical connection;

updating the first model with the second model values for the operational parameters and updating the second model with the first model values for the operational parameters;

receiving real-time operational sensor data from sensors coupled to the first machine component and the second machine component;

updating the first model with the real-time operational sensor data received from the second machine component and updating the second model with the real-time operational sensor data received from the first machine component;

synchronizing, via the processor-based system, the first and second models, including converging the first and second model values to a common modelled solution value for the same operational parameters at the common location of the same physical connection, via iteration through the plurality of simulation cycles, wherein synchronizing comprises improving an accuracy of the modeling of the operations of the physical plant in real-time;
providing, via the processor-based system, as output a simulation of behavior of the first and/or second machine components using the first and/or second models synchronized via the plurality of simulation cycles; and
changing, via the processor-based system, one or more operational parameters of the physical plant based on the simulation using the first embedded controller, the second embedded controller, or a combination thereof.

10. The method of claim 9, wherein the first proprietary data of the first vendor is kept secure via encryption, and the second proprietary data of the second vendor is kept secure via encryption.

11. The method of claim 9, further comprising:
receiving simulation input from a training user interface, the simulation input comprising first input parameters of the first machine component and second input parameters of the second machine component;
updating the first model with the first input parameters and the second model with the second input parameters, wherein the first and second input parameters effect the first and second model values for the operational parameters; and
outputting the first and second model values for the operational parameters to the training user interface.

12. The method of any one of claim 9, further comprising simulating operations of the physical plant having the first and second machine components, the simulating being based on the updated first and second models.

13. The method of any one of claim 9, wherein the at least one physical connection comprises a material stream between the first and second machine components, and the first and second model values for the operational parameters comprise one or more of a mass flow, a material composition, a pressure or a temperature.

14. The method of any one of claim 9, wherein the at least one physical connection comprises a rotating shaft connecting the first and second machine components, and the first and second model values for the operational parameters comprise one or more of a shaft speed or a shaft torque.

15. The method of claim 9, wherein the first and second machine components comprise respective first and second compressors, or respective first and second turbines, or respective first and second pumps, or respective first and second heat exchangers, or respective first and second rotating equipment.

16. The method of claim 9, comprising changing, via the processor-based system, one or more design aspects of the first and/or second machine components based on the simulation.

17. The method of claim 9, wherein changing, via the processor-based system, one or more operational parameters of the physical plant based on the simulation comprises optimizing the one or more operational parameters to improve performance and/or efficiency of the physical plant.

18. A system comprising:
a first machine component of an industrial machine of a physical plant, wherein the first machine component comprises a first embedded controller having a first model configured to model the first machine component; and
a second machine component of the industrial machine, wherein the second machine component comprises a second embedded controller having a second model configured to model the second machine component, wherein a control system of the physical plant comprises the first and second embedded controllers, wherein the first model comprises first proprietary data of a first vendor that is kept secure and not shared with the second model, wherein the second model comprises second proprietary data of a second vendor that is kept secure and not shared with the first model, wherein the first and second vendors are different from one another, wherein each of the first and second machine components comprises at least one of rotating equipment, a compressor, a pump, a turbine, an engine, an electric motor, or a heat exchanger;
wherein the control system is configured to perform a plurality of simulation cycles with the first and second models, wherein the first and second models comprise a neural network, wherein, for each of the plurality of simulation cycles, the control system is configured to:
generate first model values via the first model for operational parameters of a physical connection between the first and second machine components, and generate second model values via the second model for the operational parameters of the physical connection between the first and second machine components, wherein the first and second model values are different for the same operational parameters at a common location of the same physical connection;
receive real-time operational sensor data from sensors coupled to the first machine component and the second machine component; and
update the first model of the first embedded controller with input of the real-time operational sensor data and the second model values for the operational parameters to improve control by the first embedded controller, and update the second model of the second embedded controller with input of the real-time operational sensor data and the first model values for the operational parameters to improve control by the second embedded controller; and
wherein the control system is configured to synchronize the first and second models, including converging the first and second model values to a common modelled solution value for the same operational parameters at the common location of the same physical connection, via iteration through the plurality of simulation cycles, wherein the synchronization is configured to improve an accuracy of modeling of the first and second machine components,
wherein the control system is configured to provide as output a simulation of behavior of the first and/or second machine components using the first and/or second models synchronized via the plurality of simulation cycles;
wherein the control system is configured to change one or more operational parameters of the physical plant based on the simulation using the first embedded controller, the second embedded controller, or a combination thereof.

19. The system of claim 18, wherein the physical connection comprises a fluid connection or a mechanical linkage.

20. The system of claim 18, wherein the control system is configured to optimize the one or more operational parameters based on the simulation to improve performance and/or efficiency of the physical plant.

\* \* \* \* \*